(12) United States Patent
Kim et al.

(10) Patent No.: US 9,482,789 B2
(45) Date of Patent: *Nov. 1, 2016

(54) ANTI-REFLECTIVE COATING FILM

(71) Applicant: LG CHEM, LTD., Seoul (KR)

(72) Inventors: Heon Kim, Daejeon (KR); Yeong-Rae Chang, Daejeon (KR); Joon-Koo Kang, Daejeon (KR); Jae-Pil Koo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 88 days.

This patent is subject to a terminal disclaimer.

(21) Appl. No.: 13/841,857

(22) Filed: Mar. 15, 2013

(65) Prior Publication Data

US 2013/0215514 A1    Aug. 22, 2013

Related U.S. Application Data

(63) Continuation of application No. PCT/KR2012/004761, filed on Jun. 15, 2012.

(30) Foreign Application Priority Data

Aug. 26, 2011 (KR) .................. 10-2011-0085787
Aug. 26, 2011 (KR) .................. 10-2011-0085788
Apr. 6, 2012 (KR) .................. 10-2012-0036335

(51) Int. Cl.
*G02B 27/00* (2006.01)
*G02F 1/1335* (2006.01)
(Continued)

(52) U.S. Cl.
CPC ............. *G02B 1/11* (2013.01); *B05D 3/067* (2013.01); *B05D 5/063* (2013.01); *B32B 7/02* (2013.01);
(Continued)

(58) Field of Classification Search
CPC ............ B32B 7/02; B32B 27/14; C08J 5/18; C08J 7/042; C08J 2301/12; G02B 1/11; G02B 5/0247; G02B 1/111; G02B 1/113; G02B 5/02; G02B 5/0242; G02B 1/115; G02B 5/0236; G02B 2207/107; B05D 5/063; B05D 3/067
USPC ........ 359/601, 603; 313/500, 505, 506, 512; 345/32; 526/302; 428/423.1, 215, 522, 428/331, 328, 702, 327, 407; 427/393.5, 427/407.1; 349/96, 112, 137
See application file for complete search history.

(56) References Cited

U.S. PATENT DOCUMENTS 8,715,784 B2 * 5/2014 Horio .................. C08F 26/02
                                                                  427/407.1
8,795,825 B2    8/2014 Kim et al.
(Continued)

FOREIGN PATENT DOCUMENTS

CN        101089659 A     12/2007
CN        101128753 A      2/2008
(Continued)

OTHER PUBLICATIONS

International Search Report issued in International Appln. No. PCT/KR2012/004761 dated Dec. 26, 2012, 2 pages.
(Continued)

*Primary Examiner* — Ricky Mack
*Assistant Examiner* — Mustak Choudhury
(74) *Attorney, Agent, or Firm* — Rothwell, Figg, Ernst & Manbeck, P.C.

(57) ABSTRACT

The present invention relates to an anti-reflective coating film. This anti-reflective coating film shows more improved interface adhesion and scratch resistance, which can be manufactured by a simple process.

15 Claims, 6 Drawing Sheets

(51) Int. Cl.
G02B 1/11 (2015.01)
B32B 7/02 (2006.01)
B32B 27/14 (2006.01)
C08J 5/18 (2006.01)
G02B 1/111 (2015.01)
B05D 3/06 (2006.01)
B05D 5/06 (2006.01)
G02B 5/02 (2006.01)
C08J 7/04 (2006.01)
G02B 1/10 (2015.01)
G02B 1/115 (2015.01)
G02B 5/24 (2006.01)

(52) U.S. Cl.
CPC ................ *B32B 27/14* (2013.01); *C08J 5/18* (2013.01); *C08J 7/042* (2013.01); *G02B 1/105* (2013.01); *G02B 1/111* (2013.01); *G02B 1/115* (2013.01); *G02B 5/0236* (2013.01); *G02B 5/0247* (2013.01); *G02B 5/24* (2013.01); *C08J 2301/12* (2013.01); *G02B 2207/107* (2013.01); *Y10T 428/249958* (2015.04); *Y10T 428/249961* (2015.04); *Y10T 428/249971* (2015.04); *Y10T 428/249972* (2015.04); *Y10T 428/249974* (2015.04); *Y10T 428/249978* (2015.04); *Y10T 428/31909* (2015.04)

(56) References Cited

U.S. PATENT DOCUMENTS

| | | |
|---|---|---|
| 2007/0047087 A1 | 3/2007 | Fukuda et al. |
| 2008/0003424 A1* | 1/2008 | Kawamura ............. B05D 1/18 428/327 |
| 2008/0221290 A1* | 9/2008 | Horio ............................ 526/302 |
| 2009/0061114 A1 | 3/2009 | Ando |
| 2009/0075074 A1 | 3/2009 | Horio et al. |
| 2010/0076109 A1 | 3/2010 | Kang et al. |
| 2010/0189971 A1 | 7/2010 | Isono et al. |
| 2010/0208350 A1 | 8/2010 | Yoshihara |
| 2010/0227085 A1 | 9/2010 | Yoshihara |
| 2010/0265580 A1 | 10/2010 | Yun et al. |
| 2012/0162774 A1 | 6/2012 | Ishida et al. |
| 2013/0215514 A1 | 8/2013 | Kim et al. |
| 2013/0216819 A1 | 8/2013 | Kim et al. |
| 2013/0222915 A1 | 8/2013 | Kim et al. |

FOREIGN PATENT DOCUMENTS

| | | |
|---|---|---|
| CN | 101470216 A | 7/2009 |
| CN | 101498797 A | 8/2009 |
| CN | 101855303 A | 10/2010 |
| CN | 101855305 A | 10/2010 |
| EP | 2594614 A2 | 5/2013 |
| EP | 2749607 A1 | 7/2014 |
| JP | 2006106714 A | 4/2006 |
| JP | 2006308832 A | 11/2006 |
| JP | 2007-121993 A | 5/2007 |
| JP | 2007-133236 A | 5/2007 |
| JP | 2007-277430 A | 10/2007 |
| JP | 2008-107792 A | 5/2008 |
| JP | 2008-169364 A | 7/2008 |
| JP | 2009053691 A | 3/2009 |
| JP | 2009-086360 A | 4/2009 |
| JP | 2009151270 A | 7/2009 |
| JP | 2010-54635 A | 3/2010 |
| JP | 2010-85983 A | 4/2010 |
| JP | 2010-195901 A | 9/2010 |
| JP | 2010-217873 A | 9/2010 |
| JP | 2010-237648 A | 10/2010 |
| JP | 2010-254950 A | 11/2010 |
| JP | 2011065028 A | 3/2011 |
| JP | 2011122005 A | 6/2011 |
| JP | 2011-133862 A | 7/2011 |
| JP | 2011-145649 A | 7/2011 |
| JP | 2012-42911 A | 3/2012 |
| JP | 5075333 B2 | 11/2012 |
| KR | 10-2004-0073627 A | 8/2004 |
| KR | 10-2007-0064601 A | 6/2007 |
| KR | 1020070065858 A | 6/2007 |
| KR | 10-2009-0049558 A | 5/2009 |
| KR | 1020090049518 A | 5/2009 |
| KR | 1020100058495 A | 6/2010 |
| TW | 200813172 A | 3/2008 |
| WO | 2006/030721 A1 | 3/2006 |
| WO | 2009/081596 A1 | 2/2009 |
| WO | 2011/033976 A1 | 3/2011 |

OTHER PUBLICATIONS

Heraeus Noblelight Fusion UV Inc., What is UV Curing?, Feb. 12, 2009, 4 pages.
Fuji Silysia Chemical Ltd., Sylsia—Micronized particles with high porosity, Dec. 14, 2004, 2 pages.
W. R. Grace & Co., Colloidal Silica, Aug. 26, 2007, 2 pages.
Supplementary European Search Report issued in European Patent Application No. 12827086.5 on Mar. 12, 2015, pages.
Supplementary European Search Report issued in European Patent Application No. 12827486.7 on Mar. 12, 2015, 5 pages.
Supplementary European Search Report issued in European Patent Application No. 12828617.6 on May 7, 2015, 10 pages.
Anonymous: "Fourier transform infrared spectroscopy—Wikipedia, the free encyclopedia", Apr. 17, 2015, XP055185681, retrieved from the Internet: URL:http://en.wikipedia.org/wiki/Fourier_transform_infrared_spectroscopy#Mid-infrared_FTIR, retrieved on Apr. 24, 2015.
Supplementary European Search Report issued in European Patent Application No. 12828024.5 on May 8, 2015, 9 pages.
Supplementary European Search Report issued in European Patent Application No. 12827448.7 on May 11, 2015, 8 pages.
Supplementary European Search Report issued in European Patent Application No. 12827399.2 on May 7, 2015, 8 pages.

* cited by examiner (a)

(b)

ANTI-REFLECTIVE COATING FILM

CROSS REFERENCE TO RELATED APPLICATIONS

This application is a continuation of International Application No. PCT/KR2012/004761, filed Jun. 15, 2012, which claims priority to Korean Patent Application No. 10-2011-085787 filed Aug. 26, 2011, Korean Patent Application No. 10-2011-0085788 filed Aug. 26, 2011, and to and to Korean Patent Application No. 10-2012-0036335 filed Apr. 6, 2012, which are incorporated herein in their entireties.

TECHNICAL FIELD

The present invention relates to an anti-reflective coating film.

BACKGROUND OF ART

In general, an anti-reflective film (anti-glare film) is disposed to minimize the reflection of external light on the screen of display devices such as PDP, CRT, and LCD.

The conventional anti-reflective coating film is commonly formed by disposition of an anti-reflective layer on a light-transparent substrate. In this regard, the most widely used anti-reflective layer has a three-layer structure of a hard coat layer and high and low refractive index layers sequentially laminated from the light-transparent substrate. Recently, a two-layer structure omitting the hard coat layer or the high refractive index layer from the anti-reflective layer has been commercialized, in order to simplify the production process. In order to provide anti-glare and scratch-resistant properties, the anti-reflective coating film provided with an anti-glare hard coat layer has been also used.

Meanwhile, the anti-reflective coating film is commonly manufactured by a dry or wet method. Of the methods, the dry method is to laminate a plurality of thin layers using deposition or sputtering. This method offers superior adhesion at a layer interface, but requires high production cost, which is a limitation to commercial use.

In contrast, the wet method is to dry and cure a composition comprising a binder, a solvent, etc., after applying it onto a substrate. This method is less expensive than the dry method, and thus widely used in commercial applications. In the wet method, however, compositions required for the formation of the hard coat layer and the high and low refractive index layers should be prepared separately, and each layer is sequentially formed using the composition. Thus, the production process becomes complicated, and offers weak adhesion at a film interface.

For this reason, many studies have been actively made to develop an anti-reflective coating composition capable of forming two or more layers by a single wet coating process. However, there are still many problems that phase separation does not properly occur upon applying the compositions during the production process, and thus individual layers deteriorate in functions.

Further, the hard coat layer or the high refractive index layer is typically formed on the substrate as a pure binder or as a separate layer comprising the binder and inorganic nanoparticles, and the hollow particle-dispersed low refractive index layer is formed thereon. However, there are still problems that the anti-reflective coating film having this structure has low durability because of weak adhesion at a layer interface.

DISCLOSURE OF INVENTION

Technical Problem

The present invention provides an anti-reflective coating film showing more improved interface adhesion and scratch resistance, which can be manufactured by a simplified process.

Technical Solution

According to one embodiment of the present invention, provided is an anti-reflective coating film, comprising:
a first layer that comprises a binder and inorganic nanoparticles and that has infiltrated into a substrate; and
a second layer that comprises a binder and 2 to 5 hollow particle layers, in which each of the layers comprises sequentially connected hollow particles and the layers are adjacent to each other, and that covers the first layer.

The anti-reflective coating film may comprise a first layer that comprises a first (meth)acrylate-based binder and inorganic nanoparticles in the first (meth)acrylate-based binder, and has infiltrated into a substrate; and a second layer that comprises a second (meth)acrylate-based binder and 2 to 5 hollow particle layers in the second (meth)acrylate-based binder, and that covers the first layer.

The anti-reflective coating film may further comprise one or more hollow particles that are apart from the 2 to 5 hollow particle layers, in which one or more hollow particles may be apart from the 2 to 5 hollow particle layers with a distance of 150 nm or less. The number of the hollow particles apart from the 2 to 5 hollow particle layers may be 10% or less of the total number of the hollow particles comprised in the film.

In the anti-reflective coating film, the first (meth)acrylate-based binder may comprise a crosslinked polymer of a (meth)acrylate-based compound having a molecular weight of less than 600, and the second (meth)acrylate-based compound may comprise a crosslinked copolymer of the (meth)acrylate-based compound having a molecular weight of less than 600 and a (meth)acrylate-based compound having a molecular weight of 600 to 100,000.

Further, the first layer may further comprise the region having the crosslinked copolymer of the (meth)acrylate-based compound having a molecular weight of less than 600 and the (meth)acrylate-based compound having a molecular weight of 600 to 100,000, in addition to the region having the crosslinked polymer. In this regard, the region having the crosslinked copolymer may be located to a depth of approximately 5 to 50% of the first layer, based on the interface between the first and second layers. Further, the crosslinked copolymer may be comprised to exhibit an increasing distribution gradient toward the second layer.

In the anti-reflective coating film of one embodiment, the second layer may further comprise inorganic nanoparticles.

The second (meth)acrylate-based binder may also comprise the crosslinked copolymer further copolymerized with a fluorine-based (meth)acrylate compound, in addition to the (meth)acrylate-based compound having a molecular weight of less than 600 and the (meth)acrylate-based compound having a molecular weight of 600 to 100,000.

In the anti-reflective coating film of one embodiment, the inorganic nanoparticles may have a number average diameter of 5 to 50 nm, and for example, they may be silica nanoparticles.

Further, the hollow particles may have a number average diameter of 5 to 80 nm, and for example, they may be hollow silica particles.

Advantageous Effects

According to the present invention, two layers in an anti-reflective coating film can be formed by a single coating process, thereby forming the anti-reflective coating film by a more simplified process. Further, the anti-reflective coating film thus formed is able to maintain more improved interface adhesion and scratch resistance and to show an excellent anti-reflective effect, and thus it can be preferably used as an anti-reflective coating film in display devices, etc.

REFERENCE NUMERALS

Figure 1:
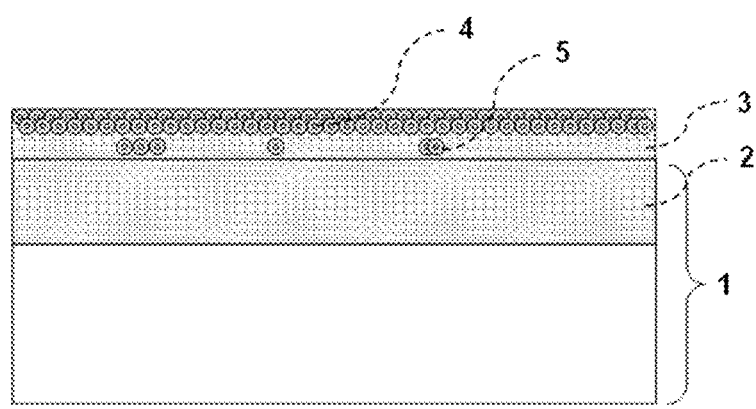
FIG. 1 is a schematic cross-sectional view showing a structure of an anti-reflective coating film according to one embodiment of the present invention.

1: Substrate
2: First layer (Hard coat layer)
3: Second layer (Low refractive index layer)
4: Hollow particles
5: One or more hollow particles apart from hollow particle layers

BEST MODE FOR CARRYING OUT THE INVENTION

Hereinafter, an anti-reflective coating film and a manufacturing method thereof according to embodiments of the present invention will be described with reference to the accompanying drawings.

In advance, unless otherwise specified throughout the specification, several terms used herein are defined as follows.

First, the term 'inorganic nanoparticle' means a particle made from various inorganic materials, and encompasses particles having a number average diameter in nanometer scale, for example, a number average diameter of 100 nm or less. These inorganic nanoparticles may be amorphous particles having substantially no void therein. For example, 'silica nanoparticles' are particles made from a silicon compound or an organic silicon compound, and means silicon compound particles or organic silicon compound particles having a number average diameter of 100 nm or less and substantially no void therein.

Further, the term 'hollow particle' means an organic or inorganic particle having a void on the surface thereof and/or therein. For example, the term 'hollow silica particle' means a silica particle that is made from a silicon compound or an organic silicon compound and has a void on the surface of and/or inside the silica particle.

The term 'hollow particle layer' refers to a hollow particle line that is formed by sequentially connecting hollow particles in parallel to the substrate, and is formed as a layer on the substrate. However, all of the hollow particles comprised in one 'hollow particle layer' may not be connected sequentially. Among the hollow particles constituting the 'hollow particle layer', for example, approximately 5% or less, or approximately 1% or less of the hollow particles may not be connected to other hollow particles, and may be connected discontinuously. In addition, the 'hollow particle layers adjacent to each other' mean that the hollow particles corresponding to at least approximately 40% or more, or approximately 50% or more, or approximately 60% or more, or approximately 70% or more, or approximately 80% or more, or approximately 90% or more of the hollow particles constituting any 'hollow particle layer' are in contact with the hollow particles constituting other 'hollow particle layer' in parallel to the substrate.

Further, the term '(meth)acrylate' is defined to encompass acrylate and methacrylate. The term '(meth)acrylate' may be also defined to have no fluorine-comprising substituent, and a compound having the fluorine-comprising substituent may be referred to as a fluorine-based (meth)acrylate compound, in order to distinguish from each other.

Further, the term 'coating layer' means a composition layer formed by applying (coating) the anti-reflective coating composition set forth below on a substrate film.

Further, the term 'phase separation' refers to the difference in distribution of a particular component from other components in the composition due to a difference in density, surface tension, or other physical properties of the components. Herein, when phase separation in the coating occurs, at least two layers that can be distinguished are formed according to the distribution difference of a particular component, for example, distribution difference of hollow particles.

Further, the phrase 'infiltrated into the substrate' means that ingredients for forming any layer of the anti-reflective coating film (for example, (meth)acrylate-based compound for forming a binder for the corresponding layer and inorganic nanoparticles, etc) penetrate into the substrate to form the corresponding layer. For example, the ingredients that penetrate into the substrate are dried and cured so as to form a particular layer in the region of the substrate into which they have penetrated. In contrast, the phrase 'a layer is formed on the substrate' means that the ingredients for forming the corresponding layer substantially do not penetrate into the substrate, and they are dried and cured while forming an interface with the substrate, thereby forming a layer on the substrate without an overlapping region with the substrate by penetrating into the substrate.

Further, the phrase 'a layer (e.g., the second layer of one embodiment of the present invention) covers the other layer (e.g., the first layer of that embodiment)' means that there is substantially no distinctive layer between the two layers. For example, in the anti-reflective coating film of one embodiment, 'the second layer comprising hollow particles covers the first layer that has infiltrated into the substrate' means that there is substantially no separate and distinctive layer between the first layer infiltrated into the substrate and the second layer comprising hollow particles, for example, substantially no separate layer that has not infiltrated into the substrate and does not comprise hollow particles. For example, in one embodiment, a separate layer that comprises only the binder (e.g., crosslinked polymer formed from the (meth)acrylate-based compound) and/or inorganic nanoparticles and that has not infiltrated into the substrate does not exist between the first layer, that is, the infiltration layer and the second layer comprising hollow particles.

Meanwhile, the present inventors have studied the anti-reflective coating film. As a result, they found that when the anti-reflective coating film is manufactured while inducing spontaneous phase separation using a certain anti-reflective coating composition, the anti-reflective coating film shows more improved interface adhesion and scratch resistance and an excellent anti-reflective effect, thereby completing the present invention. These excellent properties of the anti-reflective coating film are likely to be attributed to the specific structure of the film, in which the first layer serving as the hard coat layer has infiltrated into the substrate and the second layer serving as the low refractive index layer is formed to cover the first layer.

In contrast, the anti-reflective coating film having the structure of forming a separate hard coat layer comprising substantially no hollow particles (e.g., a separate hard coat layer or high refractive index layer comprising the binder and substantially no hollow particles, or only the binder and the inorganic nanoparticles) between the substrate and the low refractive index layer is disadvantageous in that additional coating or curing process is required for the formation of each layer, and thus the production process becomes complicated, or offers weak adhesion at a layer interface.

The anti-reflective coating film of one embodiment comprises 2 to 5 hollow particle layers that are formed by sequentially connecting hollow particles compactly formed in the second layer (low refractive index layer), in which these hollow particle layers are adjacent to each other in the second layer. Therefore, the anti-reflective coating film of one embodiment is able to exhibit more excellent anti-reflective effect and greatly improved interface adhesion.

The anti-reflective coating film of one embodiment may comprise the first layer that comprises the binder and inorganic nanoparticles and that has infiltrated into the substrate; and the second layer that comprises the binder and 2 to 5 hollow particle layers, in which each of the layers comprises sequentially connected hollow particles and the layers are adjacent to each other, and that covers the first layer. According to a more specific example, the anti-reflective coating film may comprise the first layer that comprises the first (meth)acrylate-based binder and inorganic nanoparticles in the first (meth)acrylate-based binder, and that has infiltrated into the substrate; the second layer that comprises the second (meth)acrylate-based binder and 2 to 5 hollow particle layers in the second (meth)acrylate-based binder, and that covers the first layer.

In the anti-reflective coating film, the first layer infiltrated into the substrate may serve as the hard coat layer of the anti-reflective coating film, and also as the high refractive index layer showing a refractive index of approximately 1.5 or more. The first (meth)acrylate-based binder infiltrated into the substrate is comprised in the hard coat layer, and the first (meth)acrylate-based binder may comprise the crosslinked polymer of the (meth)acrylate-based compound having a molecular weight of less than 600. In addition, the hard coat layer may comprise inorganic nanoparticles in the first (meth)acrylate-based binder.

Further, in the second layer that is in contact with and covers the first layer as the infiltration layer in the substrate, all or most (e.g., approximately 97% by weight or more, or approximately 99% by weight or more) of the hollow particles are substantially distributed, and thus the second layer functions as the low refractive index layer of the anti-reflective coating film. This low refractive index layer shows a low refractive index of approximately 1.45 or less, thereby exhibiting proper anti-reflective effect. More particularly, the hollow particles in the second layer are connected to each other to form a hollow particle layer, and 2 to 5, or 2 to 4 hollow particle layers are adjacent to each other and compactly formed in the second layer. Therefore, the second layer is able to exhibit lower refractive index and excellent anti-reflective effect and scratch-resistance.

The low refractive index layer comprises the second (meth)acrylate-based binder, which may comprise the crosslinked copolymer of the (meth)acrylate-based compound having a molecular weight of less than 600 and the (meth)acrylate-based compound having a molecular weight of 600 to 100,000. In addition, the above described 2 to 5 hollow particle layers may be comprised in the second (meth)acrylate-based binder of the low refractive index layer.

In the anti-reflective coating film, the first (meth)acrylate-based binder of the first layer serving as the hard coat layer may further comprise the crosslinked copolymer of the (meth)acrylate-based compound having a molecular weight of less than 600 and the (meth)acrylate-based compound having a molecular weight of 600 to 100,000. The second layer serving as the low refractive index layer may further comprise the inorganic nanoparticles.

FIG. 1 is a schematic cross-sectional view showing the anti-reflective coating film according to an exemplary embodiment. With reference to FIG. 1, in the anti-reflective coating film, the first layer 2 serving as the hard coat layer is infiltrated into the substrate 1, and cured therein, and the second layer 3 serving as the low refractive index layer is formed on the substrate by contacting with and covering the first layer 2 as the infiltration layer. In this regard, there is no separate layer between the first layer 2 infiltrated into the substrate and the second layer 3 on the substrate, which means that a separate layer, for example, comprising only the binder and/or the inorganic nanoparticles and substantially no hollow particles and without have infiltrated into the substrate does not exist between the first layer as the infiltration layer and the second layer substantially having hollow particles.

As the first layer 2 serving as the hard coat layer has infiltrated into the substrate 1, and the second layer 3 serving as the low refractive index layer is formed to be in contact therewith, the anti-reflective coating film of another embodiment has excellent interface adhesion between the substrate, hard coat layer and low refractive index layer, and therefore, delamination can be minimized during use.

Further, a ratio of the cross-sectional area of the hollow particles to any cross-sectional area of the second layer is made to be approximately 70 to 95%, or approximately 75 to 93%, or approximately 80 to 90%, or approximately 85 to 92%, and thus the hollow particles can be compactly distributed in the second layer serving as the low refractive index layer. Therefore, the anti-reflective coating film of one embodiment exhibits excellent low refractive index property and anti-reflective effect.

Hereinafter, individual layers comprised in the anti-reflective coating film will be described in more detail.

First, the anti-reflective coating film comprises the substrate. As shown in FIG. 1, the substrate 1 is a typical transparent thin film, and any material may be used without limitation, as long as it can be infiltrated with the first (meth)acrylate-based binder of the first layer and the inorganic nanoparticles. For example, the substrate may be made from polyester-based resins, polycarbonate-based resins, acrylic-based resins, acetate cellulose resins or the like. In one embodiment, a triacetate cellulose (TAC) resin may be used as the substrate in order to improve transparency and anti-reflective effect.

Further, the anti-reflective coating film may comprise the first layer 2 serving as the hard coat layer, which comprises the crosslinked polymer of the (meth)acrylate-based compound having a molecular weight of less than 600 as the first (meth)acrylate-based binder, and the inorganic nanoparticles in the first (meth)acrylate-based binder. The hard coat layer may be a layer infiltrated into the substrate. The first layer 2 may be cured and integrated into the substrate by infiltration of the first (meth)acrylate-based binder and the inorganic nanoparticles into the substrate. Even though FIG. 1 shows infiltration of the first layer 2 into the entire surface of the substrate 1, the first layer 2 may infiltrate into a part of the substrate 1 in another embodiment.

The second layer 3 serving as the low refractive index layer is formed to be in contact with and cover the first layer 2 that has infiltrated into the substrate 1, and it may be a layer comprising 2 to 5 hollow particle layers 4 adjacent to each other. Each of these hollow particle layers 4 comprises a plurality of hollow particles that are sequentially connected to each other in parallel to the substrate, and formed as a layer on the substrate, and 2 to 5 layers of these hollow particle layers 4 are adjacent to each other, and the hollow particles are compactly distributed in the second layer. Owing to distribution of the hollow particles and the hollow particle layers, the anti-reflective coating film of one embodiment is able to exhibit excellent anti-reflective effect.

However, the anti-reflective coating film of one embodiment may further comprise one or more hollow particles 5 that are apart from the 2 to 5 hollow particle layers 4 compactly distributed in the second layer. However, in the anti-reflective coating film of one embodiment, the hollow particles 5 may be apart from the 2 to 5 hollow particle layers 4 with a relatively short distance of approximately 150 nm or less, or approximately 100 nm or less, or approximately 50 nm or less, or approximately 30 nm or less, or approximately 5 to 30 nm. In addition, in the anti-reflective coating film of one embodiment, the number of the hollow particles 5 apart from the 2 to 5 hollow particle layers 4 may be approximately 10% or less, or approximately 7% or less, or approximately 5% or less, or approximately 3% or less, or approximately 1 to 3% of the total number of the hollow particles comprised in the film. As such, since most of the hollow particles are compactly distributed in the second layer, and at least independently separate hollow particles are comprised, the anti-reflective coating film of one embodiment is able to exhibit more improved anti-reflective properties.

Meanwhile, a separate layer comprising only the binder and/or inorganic nanoparticles and having not infiltrated into the substrate does not exist between the first layer 2 and the second layer 3. As in the known films, a separate film comprising only the binder exists between the hard coat layer and the low refractive index layer results in a disadvantage of reducing adhesion between each layer and the substrate. In contrast, the anti-reflective coating film of one embodiment is formed such that the second layer 3 serving as the low refractive index layer is in contact with the substrate 1 and the first layer 2 serving as the hard coat layer, thereby showing more improved interface adhesion, scratch resistance, and anti-reflective effect.

Herein, the second (meth)acrylate-based binder of the second layer 3 may comprise the crosslinked copolymer of the (meth)acrylate-based compound having a molecular weight of less than 600 and the (meth)acrylate-based compound having a molecular weight of 600 to 100,000. In another embodiment, the second (meth)acrylate-based binder may comprise the crosslinked copolymer of the (meth)acrylate-based compound having a molecular weight of less than 600, the (meth)acrylate-based compound having a molecular weight of 600 to 100,000 and the fluorine-based (meth)acrylate compound. As the crosslinked copolymer prepared by further copolymerizing with the fluorine-based (meth)acrylate compound is comprised in the second (meth)acrylate-based binder, the second layer 3 serving as the low refractive index layer shows a lower refractive index and excellent anti-reflective effect. In addition, the scratch resistance of the second layer 3 can be more improved.

In addition, the second layer 3 may further comprise the inorganic nanoparticles in the second (meth)acrylate-based binder, thereby more improving the scratch resistance and anti-reflective effect of the second layer 3.

Meanwhile, the first (meth)acrylate-based binder of the first layer 2 may further comprise the crosslinked copolymer of the (meth)acrylate-based compound having a molecular weight of less than 600 and the (meth)acrylate-based compound having a molecular weight of 600 to 100,000, in addition to the crosslinked polymer of the above mentioned (meth)acrylate-based compound having a molecular weight of less than 600.

In this regard, the crosslinked copolymer in the first (meth)acrylate-based binder of the first layer 2 may be comprised in certain region of the first layer 2, based on the interface between the first layer 2 and the second layer 3, for example, to approximately 5 to 50% depth, or approximately 5 to 45% depth, or approximately 5 to 40% depth of the first layer 2. The crosslinked copolymer in the binder of the first layer 2 may be comprised to exhibit an increasing distribution gradient toward the second layer 3.

As such, the (meth)acrylate-based compound having a molecular weight of 600 to 100,000 is crosslinked copolymerized with the (meth)acrylate-based compound having a molecular weight of less than 600 with distribution gradient to the predetermined depth of the first layer 2, and the crosslinked copolymers are also comprised throughout the second layer 3. Therefore, the interface adhesion between the first layer 2 and the second layer 3 can be more improved, and hollow particles comprised in the second layer 3 can be more compactly distributed.

In the above mentioned anti-reflective coating film, the first layer 2 is a layer having a higher refractive index than the second layer 3 serving as the low refractive index layer, and the refractive index may be approximately 1.5 to 1.58, or approximately 1.5 to 1.57, or approximately 1.51 to 1.56. In addition, the second layer 3 may have a refractive index of approximately 1.1 to 1.45, or approximately 1.15 to 1.43, or approximately 1.2 to 1.42.

In addition, the anti-reflective coating film according to another embodiment has a reflectance of approximately 0.5 to 4%, or approximately 0.8 to 3%, or approximately 1 to 2% to show excellent anti-reflective properties, and thus it can be properly used as the anti-reflective coating film in various display devices such as PDP, CRT or LCD.

Hereinafter, the anti-reflective coating composition for forming the anti-reflective coating film of one embodiment and the method for manufacturing the anti-reflective coating film using the same will be described.

The anti-reflective coating composition may comprise the (meth)acrylate-based compound having a molecular weight of less than 600; the (meth)acrylate-based compound having a molecular weight of 600 to 100,000; inorganic nanoparticles; and hollow particles. Each component of the composition will be described as follows.

(Meth)Acrylate-Based Compound Having Molecular Weight of Less than 600

First, the anti-reflective coating composition may comprise the (meth)acrylate-based compound having a molecular weight of less than 600. If the composition is applied to any substrate, at least a part of the (meth)acrylate-based compound having a low molecular weight may infiltrate into the substrate.

The low molecular weight-(meth)acrylate-based compound infiltrated into the substrate may be polymerized alone or copolymerized with the high molecular weight-(meth)acrylate-based compound explained below and having a molecular weight of 600 to 100,000 to form a binder of the first layer corresponding to the infiltrated region.

The residual low molecular weight-(meth)acrylate-based compound may remain on the substrate without infiltration into the substrate. The residual compound is copolymerized with the high molecular weight-(meth)acrylate-based compound explained below to form a binder of the second layer that covers the first layer formed in the infiltrated region of the substrate.

In order to sufficiently infiltrate the low molecular weight-(meth)acrylate-based compound into the substrate and to form the binder of the first layer serving as the hard coat layer of the anti-reflective coating film, the low molecular weight-(meth)acrylate-based compound may have, for example, a molecular weight of less than approximately 600, or less than approximately 500, or less than approximately 400, and in another embodiment, it may have a molecular weight of approximately 50 or more, or approximately 100 or more.

In exemplary embodiment, in order to form the first layer that has infiltrated into the substrate to show higher refractive index (e.g., hard coat layer and/or high refractive index layer), the low molecular weight-(meth)acrylate-based compound may have a substituent such as sulfur, chlorine or metal, or an aromatic substituent.

The low molecular weight-(meth)acrylate-based compound may comprise a compound selected from the group consisting of pentaerythritol tri(meth)acrylate, pentaerythritol tetra(meth)acrylate, dipentaerythritol hexa(meth)acrylate, trimethylenepropane tri(meth)acrylate, ethylene glycol di(meth)acrylate, 9,9-bis[4-(2-acryloxyethoxy)phenyl]fluorene (refractive index: 1.62), bis(4-methacryloxythiophenyl) sulfide (refractive index: 1.689), and bis(4-vinylthiophenyl) sulfide (refractive index: 1.695), or a mixture of two or more thereof.

(Meth)acrylate-Based Compound Having Molecular Weight of 600 to 100,000

Meanwhile, the anti-reflective coating composition may comprise the high molecular weight-(meth)acrylate-based compound having a molecular weight of 600 to 100,000. When the composition is applied to any substrate, a relatively smaller amount of the high molecular weight-(meth)acrylate-based compound may infiltrate into the substrate, compared to the above mentioned low molecular weight-compound, and the rest thereof may remain on the substrate, due to its high molecular weight and bulky chemical structure.

Therefore, the high molecular weight-(meth)acrylate-based compound does not infiltrate into the substrate to a depth equivalent to that of the above mentioned low molecular weight-(meth)acrylate-based compound. As a result, the infiltrated region of the substrate may be divided into the following two regions. First, in the region infiltrated with only the low molecular weight-(meth)acrylate-based compound or in the region at a depth to be infiltrated therewith, a binder formed from a crosslinked polymer of the low molecular weight-(meth)acrylate-based compound may exist. In the other infiltrated region that is infiltrated with the high molecular weight-(meth)acrylate-based compound, the crosslinked copolymer of the high molecular weight-(meth)acrylate-based compound and the low molecular weight-(meth)acrylate-based compound may exist as the binder.

The residual high molecular weight-(meth)acrylate-based compound that has not infiltrated into the substrate may be copolymerized with the above mentioned low molecular weight-(meth)acrylate-based compound to form a second (meth)acrylate-based binder of the second layer (e.g., low refractive index layer of anti-reflective coating film) covering the infiltration layer. Therefore, interface adhesion between the first layer serving as the hard coat layer of the anti-reflective coating film and the second layer covering thereon (low refractive index layer) is improved, scratch resistance of the low refractive index layer is also improved, and hollow particles in the low refractive index layer are more compactly dispersed.

The high molecular weight-(meth)acrylate-based compound is a compound having a higher molecular weight than the above mentioned low molecular weight-compound and a bulky structure. For example, it may have a molecular weight of approximately 400 or more, or approximately 500 or more, or approximately 600 or more. For another example, it may have a molecular weight of approximately 100,000 or less, or approximately 80,000 or less, or approximately 50,000 or less.

For the high molecular weight and bulky structure, the high molecular weight-(meth)acrylate-based compound may comprise a compound having a structure of linking two or more molecules of the above mentioned low molecular weight-(meth)acrylate-based compound via a linker. In this regard, the linker may be any chemical bond known to link the (meth)acrylate-based compounds, and for example, a divalent or higher-valent radical comprising a urethane bond, a thioether bond, an ether bond or an ester bond.

For more bulky structure, the high molecular weight-(meth)acrylate-based compound may also have one or more substituents selected from the group consisting of an epoxy group, a hydroxyl group, a carboxyl group, a thiol group, an aromatic or aliphatic hydrocarbon group having 6 carbon atoms or more, and an isocyanate group.

The high molecular weight-(meth)acrylate-based compound may be a commercially available product satisfying the above conditions or directly synthesized. Examples of the commercially available product may comprise UA-306T, UA-306I, UA-306H, UA-510T, UA-510I, and UA-510H (products of KYOEISHA Co.); BPZA-66 and BPZA-100 (products of KYOEISHA Co.); EB9260 and EB9970 (products of BAEYER Co.); and Miramer SP1107 and Miramer SP1114 (products of MIWON Co.).

The above mentioned high molecular weight-(meth)acrylate-based compound may be comprised in the anti-reflective coating composition in an amount of approximately 5 to 30 parts by weight, or approximately 5 to 25 parts by weight, or approximately 5 to 20 parts by weight, based on 100 parts by weight of the low molecular weight compound. The content of the high molecular weight-(meth)acrylate-based compound may be determined, considering optimization of physical properties of the layer or changes in the distribution of hollow particles according to addition of an excessive amount thereof as well as minimal effects achieved by use of the binder compositions comprising the high and low molecular weight-(meth)acrylate-based compounds.

Fluorine-Based (Meth)Acrylate Compound

Meanwhile, the above mentioned anti-reflective coating composition may further comprise the fluorine-based (meth) acrylate compound substituted with one or more fluorine atoms as the binder composition. Owing to the presence of the fluorine-containing substituent, the fluorine-based (meth)acrylate compound does not infiltrate into the substrate when the composition is applied to the substrate. For this reason, the fluorine-based (meth)acrylate compound may form the second (meth)acrylate-based binder of the second layer that serves as the low refractive index layer of the anti-reflective coating film, together with the above mentioned low and high molecular weight-(meth)acrylate compounds. The fluorine-based (meth)acrylate compound shows a lower refractive index, thereby reducing the refractive index of the low refractive index layer and showing excellent compatibility with the after-mentioned hollow particles due to polar functional groups, and also improving scratch resistance of the low refractive index layer.

The fluorine-based (meth)acrylate compound may have a structure of linking one or more fluorine-containing substituents to any (meth)acrylate compound, and examples of the fluorine-based (meth)acrylate compound may be one or more compounds selected from the group consisting of the compounds of the following Chemical Formulae 1 to 5:

[Chemical Formula 1]

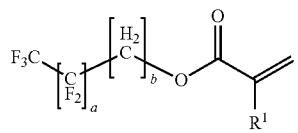

wherein $R^1$ is a hydrogen group or an alkyl group having 1 to 6 carbon atoms, a is an integer of 0 to 7, and b is an integer of 1 to 3;

[Chemical Formula 2]

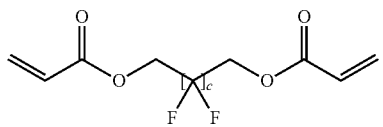

wherein c is an integer of 1 to 10;

[Chemical Formula 3]

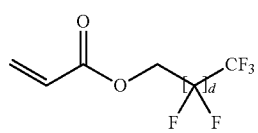

wherein d is an integer of 1 to 11;

[Chemical Formula 4]

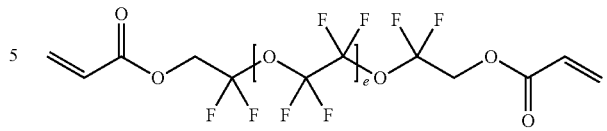

wherein e is an integer of 1 to 5;

[Chemical Formula 5]

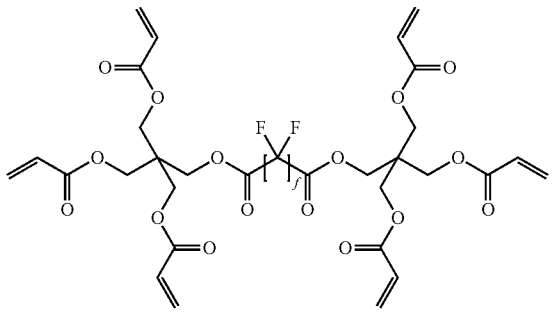

wherein f is an integer of 4 to 10.

Meanwhile, the fluorine-based (meth)acrylate compound may be comprised in the anti-reflective coating composition in an amount of approximately 0.5 to 20 parts by weight, or approximately 5 to 18 parts by weight, or approximately 10 to 16 parts by weight, based on 100 parts by weight of the above mentioned low molecular weight-(meth)acrylate compound.

The fluorine-based (meth)acrylate compound may be a commercially available product satisfying the above conditions. Examples of the commercially available product may comprise OPTOOL AR110 (manufactured by DAIKIN), LINC-3A and LINC-102A (manufactured by KYOEISHA), PFOA (manufactured by Exfluor), and OP-38Z (manufactured by DIC).

Inorganic Nanoparticles

Meanwhile, inorganic nanoparticles may be comprised in the anti-reflective coating composition.

A part of the inorganic nanoparticles may infiltrate into and be dispersed in the substrate, together with the above mentioned two or more binder compositions, when the composition is applied to a substrate. The remainder thereof that has not infiltrated into the substrate is dispersed in the second layer serving as the low refractive index layer, and contributes to the improvement of scratch resistance and anti-reflective effect.

In one embodiment, the inorganic nanoparticles may be particles that are made from various inorganic materials and have a number average diameter of nanometer scale.

These inorganic nanoparticles may have a number average diameter of, for example, approximately 100 nm or less, or approximately 5 to 50 nm, or approximately 5 to 20 nm. To control transparency, refractive index, and scratch resistance of the coating layer, the diameter of the inorganic nanoparticles should be controlled within the above range.

Further, to obtain improved transparency of the coating layer on the substrate, the silica nanoparticles made from the silicon compound or organic silicon compound may be used as inorganic nanoparticles.

The inorganic nanoparticles may be comprised in the anti-reflective coating composition in an amount of, for example, approximately 5 to 30 parts by weight, or approximately 5 to 25 parts by weight, or approximately 5 to 20 parts by weight, based on 100 parts by weight of the above mentioned low molecular weight-(meth)acrylate-based compound. The content of the inorganic nanoparticles may be controlled within the above range, considering the infiltration content of inorganic nanoparticles according to the type of substrate and a reduction of anti-reflective effect by increased reflectance resulting from addition of an excessive amount thereof as well as the minimal effect of the inorganic nanoparticles.

Meanwhile, the inorganic nanoparticles are dispersed in a dispersion medium, and may be comprised in the form of sol having a solid content of approximately 5 to 40% by weight. Herein, examples of the organic solvent to be used as the dispersion medium may comprise alcohols such as methanol, isopropyl alcohol (IPA), ethylene glycol, and butanol; ketones such as methyl ethyl ketone and methyl isobutyl ketone (MIBK); aromatic hydrocarbons such as toluene and xylene; amides such as dimethyl formamide, dimethyl acetamide, and N-methyl pyrrolidone; esters such as ethyl acetate, butyl acetate, and γ-butyrolactone; ethers such as tetrahydrofuran and 1,4-dioxane; or mixtures thereof.

According to one embodiment, commercially available silica sol may be used as the norganic particles, and exemplified by MEK-ST, MIBK-ST, MIBK-SD, MIBK-SD-L, MEK-AC, DMAC-ST, and EG-ST manufactured by Nissan chemical Co.; or Purisol manufactured by Gaematech Co.

Hollow Particles

Meanwhile, hollow particles may be further comprised in the anti-reflective coating composition. These hollow particles mean particles having voids on the surface of and/or inside the particles, and are an ingredient for achieving low refractive index and anti-reflective effect.

These hollow particles, when the composition is applied to the substrate, are substantially not distributed in the first layer that serves as the hard coat layer of the anti-reflective coating film, and they are substantially distributed in the layer covering the infiltration layer, that is, in the second layer serving as the low refractive index layer so as to form the above described 2 to 5 hollow particle layers. Herein, the hollow particles "substantially not distributed (comprised)" in the first layer mean that the content of the hollow particles present in the first layer serving as the infiltration layer in the substrate is less than approximately 5% by weight, or less than approximately 3% by weight, or less than approximately 1% by weight, based on the total weight of the hollow particles.

Meanwhile, a solvent is comprised in the composition of one embodiment, together with the above mentioned binder composition, etc., and therefore, spontaneous phase separation occurs to form the anti-reflective coating film. At this time, when phase separation occurs, the hollow particles are substantially not distributed in the first layer as the infiltration layer due to the difference in the density or in surface energy between the hollow particles and other components, and they are compactly distributed in the second layer serving as the low refractive index layer. As a result, it is possible to form the anti-reflective coating film showing more improved film strength, scratch resistance and anti-reflective property.

The material of these hollow particles is not particularly limited, as long as it is in the form of particles having voids on the surface of and/or inside the particles. In one embodiment, in order to provide the low refractive index layer with transparency and/or low refractive index, hollow silica particles generated from the silicon compound or organic silicon compound may be used.

At this time, the diameter of the hollow particles may be determined within the range of maintaining transparency of the film and showing anti-reflective effect. For example, the hollow particles may have a number average diameter of approximately 5 to 80 nm, or approximately 10 to 75 nm, or approximately 20 to 70 nm.

The hollow particles may be comprised in the anti-reflective coating composition in an amount of approximately 1 to 30 parts by weight, or approximately 1 to 25 parts by weight, or approximately 5 to 20 parts by weight, based on 100 parts by weight of the above mentioned low molecular weight-(meth)acrylate-based compound. In order to achieve their minimal effect of hollow particles and formation of their preferred distribution by phase separation, the content of the hollow particles may be controlled within the above mentioned range.

Further, the hollow particles may be dispersed in a dispersion medium (water or organic solvent), and comprised in the form of colloid having a solid content of approximately 5 to 40% by weight. Herein, examples of the organic solvent to be used as the dispersion medium may comprise alcohols such as methanol, isopropyl alcohol (IPA), ethylene glycol, and butanol; ketones such as methyl ethyl ketone and methyl isobutyl ketone (MIBK); aromatic hydrocarbons such as toluene and xylene; amides such as dimethyl formamide, dimethyl acetamide, and N-methyl pyrrolidone; esters such as ethyl acetate, butyl acetate, and γ-butyrolactone; ethers such as tetrahydrofuran and 1,4-dioxane; or mixtures thereof.

Solvent

A solvent may be further comprised in the above mentioned anti-reflective coating composition. The solvent functions to control infiltration of the binder compositions into the substrate and the phase separation and distribution pattern of hollow particles as well as the viscosity of the composition within the proper range.

In order to achieve the above effects, the solvent may be a solvent having a dielectric constant (25° C.) of approximately 20 to 30 and a dipole moment of approximately 1.7 to 2.8. Examples of the solvent capable of satisfying these physical properties may comprise methyl ethyl ketone, ethyl acetate, acetyl acetone or the like, and any solvent capable of satisfying the physical properties can be also used. According to one embodiment, other solvent may be also mixed, together with the solvent capable of satisfying the physical properties. Examples of the solvent to be mixed may comprise isobutyl ketone, methanol, ethanol, n-butanol, i-butanol, t-butanol or the like. However, in terms of proper phase separation, it is preferable that the solvent satisfying the range of the dielectric constant and dipole moment is comprised in an amount of approximately 60% by weight or more, based on the total weight of the solvent comprised in the composition.

In the anti-reflective coating composition, the solvent may be comprised in an amount of, for example, approximately 100 to 500 parts by weight, or approximately 100 to 450 parts by weight, or approximately 100 to 400 parts by weight, based on 100 parts by weight of the above mentioned low molecular weight-(meth)acrylate-based compound. If the composition shows bad flowability upon coating, defects such as stripes on the coating layer may be generated. In order to provide the composition with the minimum flowability required, the solvent may be comprised in the predetermined content or more. When an excessive amount of the solvent is added, the solid content becomes too low, and therefore, defects may be generated upon drying and curing, and the distribution of the hollow particles may be deviated from the preferred range.

Initiator

Meanwhile, an initiator may be further comprised in the above mentioned anti-reflective coating composition. The initiator is a compound that is activated by energy ray such as ultraviolet ray so as to induce polymerization of the binder compositions. A compound typically used in the art may be used.

Examples of the initiator may comprise 1-hydroxy cyclohexylphenyl ketone, benzyl dimethyl ketal, hydroxy dimethyl acetophenone, benzoin, benzoin methyl ether, benzoin ethyl ether, benzoin isopropyl ether or benzoin butyl ether, and various other photopolymerization initiators.

At this time, the content of the initiator may be, for example, approximately 5 to 25 parts by weight, or approximately 5 to 20 parts by weight, or approximately 5 to 15 parts by weight, based on 100 parts by weight of the low molecular weight-(meth)acrylate-based compound. For sufficient polymerization of the binder compositions, the initiator may be comprised in the predetermined content or more. When an excessive amount of the initiator is added, each layer constituting the anti-reflective coating film may have the reduced mechanical properties such as scratch resistance or abrasion resistance.

Figure 2:
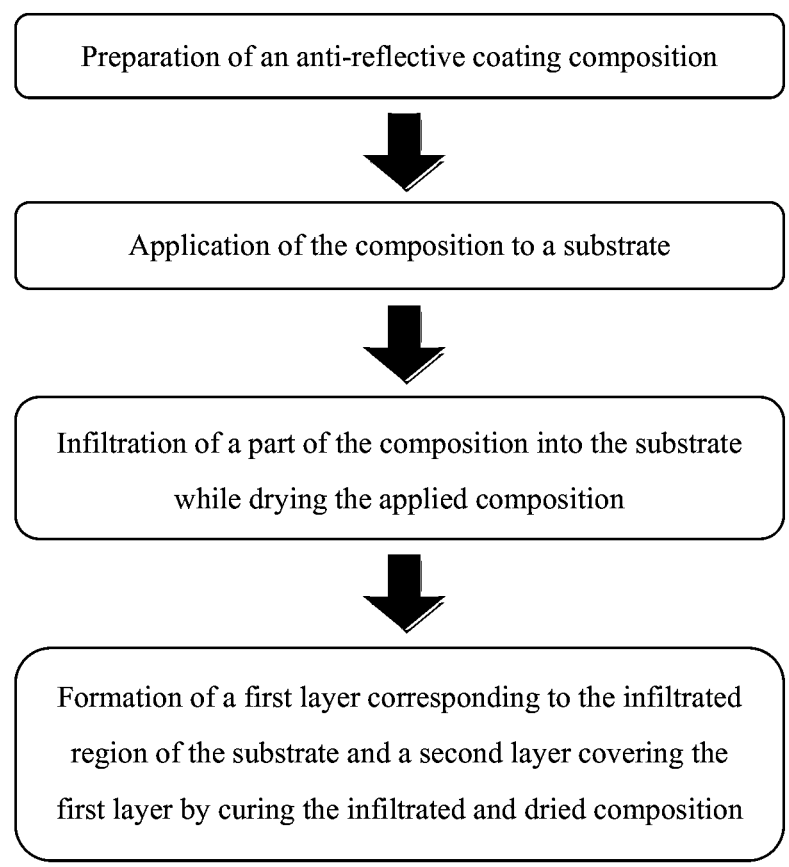
FIG. 2 is a schematic flow chart showing a manufacturing method of an anti-reflective coating film according to one embodiment of the present invention.

Next, the method for manufacturing the anti-reflective coating film using the above mentioned anti-reflective coating composition will be described. FIG. 2 is a schematic flow chart showing the manufacturing method of one embodiment, in which the anti-reflective coating film is manufactured using the above mentioned anti-reflective coating composition.

With reference to FIG. 2, the method for manufacturing the anti-reflective coating film comprises the steps of preparing the above mentioned anti-reflective coating composition; applying it onto at least one surface of the substrate; drying the composition to allow a part of the binder composition and inorganic nanoparticles to be infilterated into the substrate; and curing the infiltrated and dried composition to form the first layer corresponding to the infiltrated region of the substrate, and the second layer that comprises hollow particles and covers the first layer.

Through the manufacturing method, the solvent having certain physical properties in the composition may first dissolve a part of the substrate, and subsequently, parts of the binder compositions (e.g., parts of the (meth)acrylate-based compounds having low and high molecular weights) and at least a part of the inorganic nanoparticles may infiltrate into the substrate. At this time, the remainder of the binder compositions and the inorganic nanoparticles that have not infiltrated, and the hollow particles may form the coating layer (e.g., second layer) on the substrate. In particular, this coating layer may remain as a thin layer on the substrate that is infiltrated with the above components, and the hollow particles may compactly exist inside the coating layer so as to form 2 to 5 hollow particle layers.

Thereafter, when a curing process is performed, the first and second (meth)acrylate-based binders of the first and second layers are formed, and the first layer serving as the hard coat layer may be formed as an infiltration layer inside the substrate and the second layer comprising 2 to 5 hollow particle layers adjacent to each other may be formed to cover the first layer. As a result, the anti-reflective coating film of one embodiment can be manufactured.

As described above, even though a single coating and curing process is applied using a single composition, the anti-reflective coating film of one embodiment can be manufactured by a simple process owing to infiltration of parts of the components into the substrate and phase separation. In this anti-reflective coating film, in particular, the first layer serving as the hard coat layer has infiltrated into the substrate to be in contact with the second layer, thereby showing excellent interface adhesion and mechanical properties. In this anti-reflective coating film, furthermore, a separate layer does not exist between the first and second layers, and hollow particles are compactly present in the second layer so as to form 2 to 5 hollow particle layers adjacent to each other, thereby showing lower refractive index and excellent anti-reflective property. As the above mentioned anti-reflective coating composition comprises at least two types of the binder compositions and the solvent having the predetermined physical properties, infiltration into the substrate and phase separation can be optimized.

In the method for manufacturing the above anti-reflective coating film, the method of applying the composition onto at least one surface of the substrate may be performed using a coating apparatus and method typically used in the art, such as wire bar.

Further, the drying process may be performed at the temperature of approximately 5 to 150° C. for approximately 0.1 to 60 minutes, approximately 20 to 120° C. for approximately 0.1 to 20 minutes, or approximately 30 to 110° C. for approximately 1 to 10 minutes, in order to facilitate phase separation of the composition and infiltration of the composition into the substrate.

Further, in the curing process, polymerization is initiated by applying energy to the dried composition such as photoradiation, thereby curing the infiltrated and dried composition. In the curing process, UV radiation may be performed at approximately 0.1 to 2 J/cm$^2$ for approximately 1 to 600 seconds, or approximately 0.1 to 1.5 J/cm$^2$ for approximately 2 to 200 seconds, or approximately 0.2 to 1 J/cm$^2$ for approximately 3 to 100 seconds, in order to induce sufficient curing reaction.

Through this method, the above mentioned anti-reflective coating film of one embodiment can be obtained, in which a ratio of the cross-sectional area of the hollow particles to any cross-sectional area of the second layer serving as the low refractive index layer is made to be approximately 70 to 95%, or approximately 75 to 93%, or approximately 80 to 90%, or approximately 85 to 92%, and thus the hollow particles can be compactly distributed in the low refractive index layer.

It is apparent that the method for manufacturing the anti-reflective coating film further comprises the steps typically performed in the art before or after each step, in addition to the above described steps.

Hereinafter, preferred Examples of the present invention will be described for better understanding. However, the following Examples are given for illustrative purposes only, and are not intended to limit the present invention.

Example 1

Preparation of Anti-Reflective Coating Composition

Based on 100 parts by weight of a (meth)acrylate-based compound comprising 100 parts by weight of pentaerythritol hexaacrylate (molecular weight: 298.3) and 11.33 parts by weight of acrylate having a urethane functional group (manufactured by KYOEISHA, product name: UA-306T, molecular weight: 1000);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819, and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

(Manufacturing of Anti-Reflective Coating Film)

The anti-reflective coating composition was applied to a triacetate cellulose film (thickness of 80 μm) using a wire bar (No. 9). The film was dried in a 90° C. oven for 1 minute, and then UV energy of 200 mJ/cm² was irradiated thereto for 5 seconds to cure the composition.

Finally, an anti-reflective coating film comprising a hard coat layer formed by infiltration into a substrate and a low refractive index layer covering the hard coat layer was manufactured.

Figure 3:
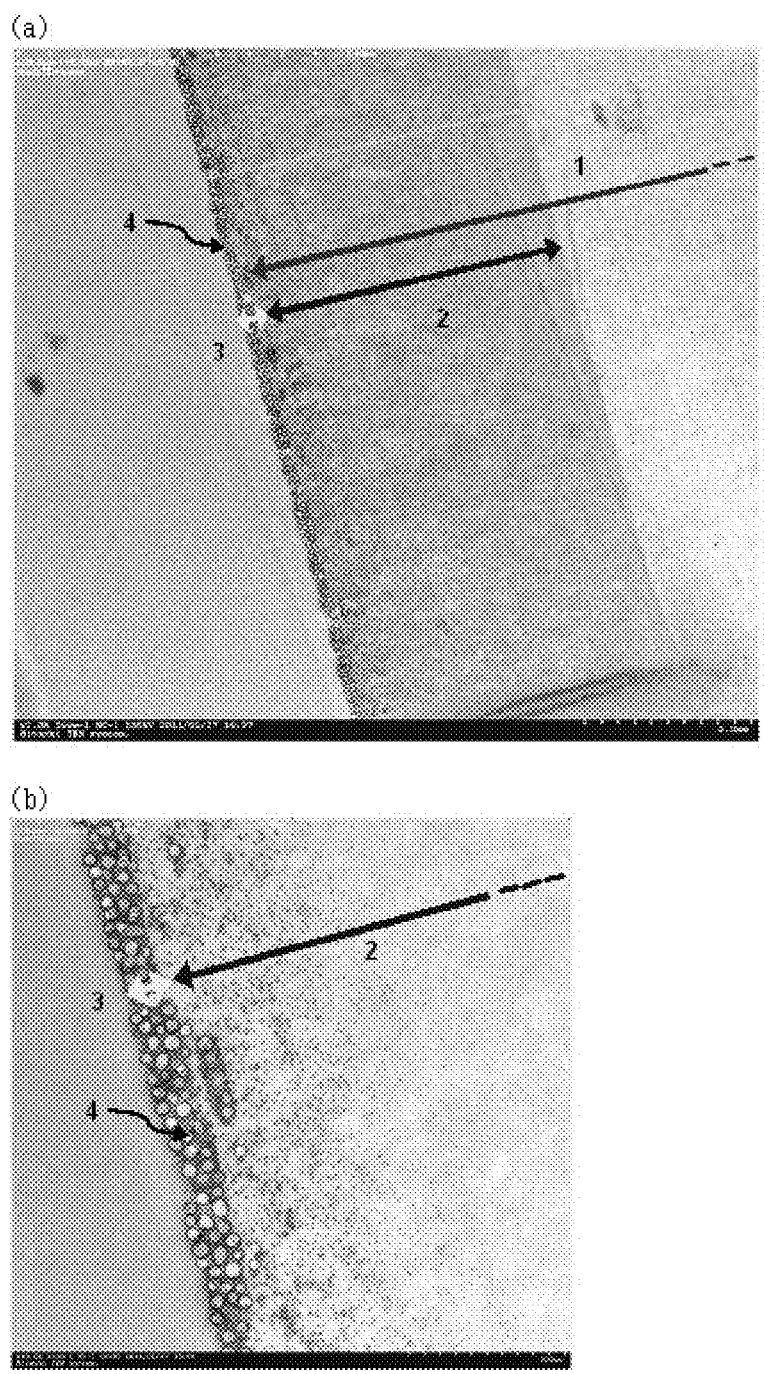
FIGS. 3 to 6 are microscopic images showing the cross-sections of anti-reflective coating films according to Examples 1, 2, and 4 and Comparative Example 1, respectively.

A cross-sectional image of the anti-reflective coating film is shown in FIG. 3(a), and a microscopic image of a part thereof is shown in FIG. 3(b). As shown in FIG. 3, the anti-reflective coating film according to Example 1 was found to have a hard coat layer 2 (approximately 3.9 μm) comprising a binder cured by infiltration into a substrate 1 and inorganic nanoparticles dispersed in the binder; and a low refractive index layer 3 (approximately 0.15 μm) comprising a binder cured on the hard coat layer 2 and hollow particle layers 4 dispersed in the binder.

In addition, there was no separate layer between the hard coat layer 2 and the low refractive index layer 3, and a ratio of the cross-sectional area of the hollow particles to any cross-sectional area of the low refractive index layer 3 was approximately 90%, indicating that hollow particles were very compactly distributed in the low refractive index layer 3. In the low refractive index layer 3, 3 to 5 hollow particle layers 4 were formed to be adjacent to each other, and the number of the hollow particles apart from the hollow particle layers was only approximately 5% of the total number of the hollow particles.

Example 2

Preparation of Anti-Reflective Coating Composition

Based on 100 parts by weight of a (meth)acrylate-based compound comprising 100 parts by weight of pentaerythritol hexaacrylate (molecular weight: 298.3), 11.33 parts by weight of fluorine-based acrylate (product name: OPTOOL AR110, manufactured by DAIKIN, solid content: 15% by weight, methyl isobutyl ketone solvent), and 11.33 parts by weight of acrylate having a urethane functional group (manufactured by KYOEISHA, product name: UA-306T, molecular weight: 1000);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photopolymerization initiator (specifically, approximately 1.11 parts by weight of Darocur-1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

(Manufacturing of Anti-Reflective Coating Film)

An anti-reflective coating film was manufactured under the same conditions and in the same manner as in Example 1, except using the above anti-reflective coating composition.

Figure 4:
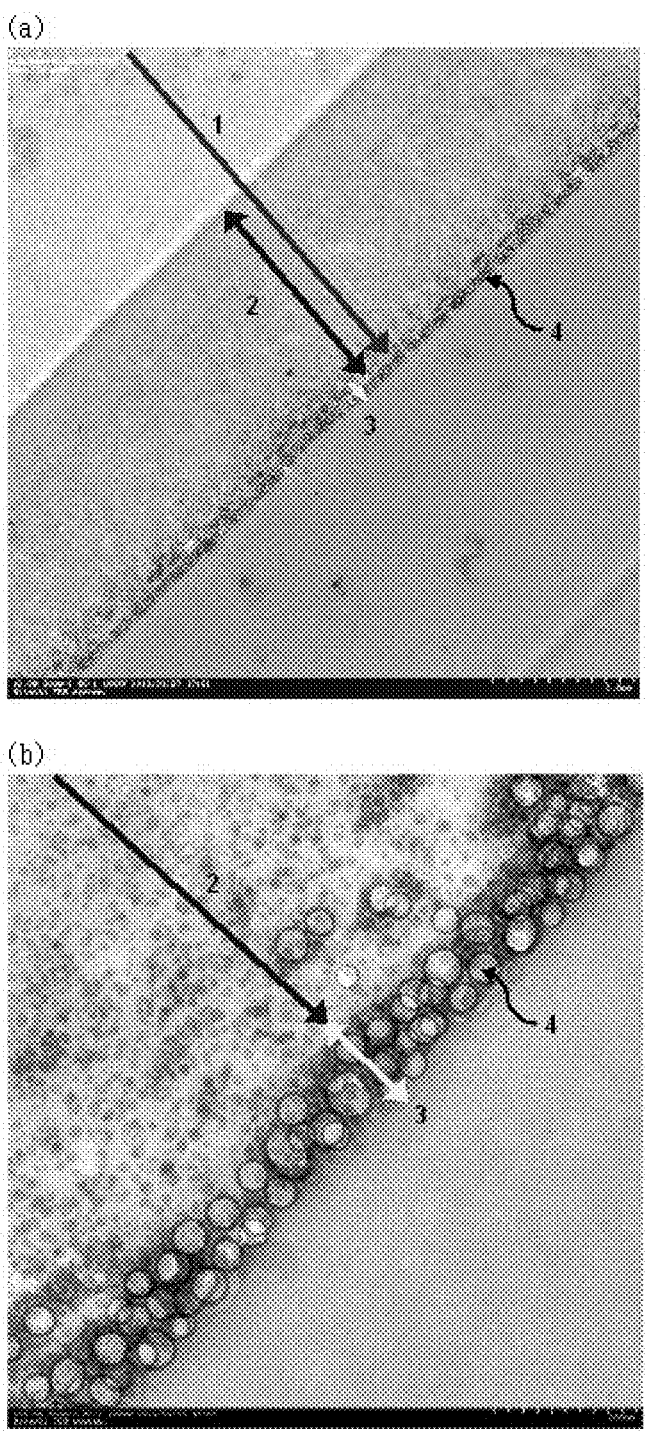

A cross-sectional image of the anti-reflective coating film is shown in FIG. 4(a), and a microscopic image of a part thereof is shown in FIG. 4(b). The anti-reflective coating film according to Example 2 was found to have a hard coat layer 2 (approximately 2.8 μm) comprising a binder cured by infiltration into a substrate 1 and inorganic nanoparticles dispersed in the binder; and a low refractive index layer 3 (approximately 0.145 μm) comprising a binder cured on the hard coat layer 2 and hollow particle layers 4 dispersed in the binder.

In addition, there was no separate layer between the hard coat layer 2 and the low refractive index layer 3, and a ratio of the cross-sectional area of the hollow particles to any cross-sectional area of the low refractive index layer 3 was approximately 90%, indicating that hollow particles were very compactly distributed in the low refractive index layer 3. In the low refractive index layer 3, 2 to 4 hollow particle layers 4 were formed to be adjacent to each other, and the number of the hollow particles apart from the hollow particle layers was only approximately 4% of the total number of the hollow particles.

In the anti-reflective coating film according to Example 2, in particular, fluorine-based acrylate was comprised in the low refractive index layer, and thus phase separation of the composition effectively occurred, and scratch resistance was also improved.

Example 3

Preparation of Anti-Reflective Coating Composition

Based on 100 parts by weight of a (meth)acrylate-based compound comprising 100 parts by weight of pentaerythritol hexaacrylate (molecular weight: 298.3) and 11.33 parts by weight of acrylate having a urethane functional group (manufactured by KYOEISHA, product name: 510H, molecular weight 2000);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

(Manufacturing of Anti-Reflective Coating Film)

The anti-reflective coating composition was applied to a triacetate cellulose film (thickness of 80 μm) using a wire bar (No. 9). The film was dried in a 90° C. oven for 1 minute, and then UV energy of 200 mJ/cm$^2$ was irradiated thereto for 5 seconds to cure the composition.

Finally, an anti-reflective coating film comprising a hard coat layer formed by infiltration into a substrate and a low refractive index layer covering the hard coat layer was manufactured.

A cross-sectional image of the anti-reflective coating film was visualized by SEM. As a result, the anti-reflective coating film according to Example 3 was found to have a hard coat layer (approximately 3.1 μm) comprising a binder cured by infiltration into a substrate and inorganic nanoparticles dispersed in the binder; and a low refractive index layer (approximately 0.16 μm) comprising a binder cured on the hard coat layer and hollow particles dispersed in the binder.

In addition, there was no separate layer between the hard coat layer and the low refractive index layer, and a ratio of the cross-sectional area of the hollow particles to any cross-sectional area of the low refractive index layer was approximately 90%, indicating that hollow particles were very compactly distributed in the low refractive index layer. In the low refractive index layer 3, 3 to 5 hollow particle layers were formed to be adjacent to each other, and the number of the hollow particles apart from the hollow particle layers was only approximately 5% of the total number of the hollow particles.

Example 4

Preparation of Anti-Reflective Coating Composition

Based on 100 parts by weight of a (meth)acrylate-based compound comprising 100 parts by weight of pentaerythritol hexaacrylate (molecular weight: 298.3) and 11.33 parts by weight of acrylate having an ester functional group (manufactured by SK Cytec, product name: DPHA, molecular weight: 524);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photopolymerization initiator (specifically, approximately 1.11 parts by weight of Darocur-1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

(Manufacturing of Anti-Reflective Coating Film)

The anti-reflective coating composition was applied to a triacetate cellulose film (thickness of 80 μm) using a wire bar (No. 9). The film was dried in a 90° C. oven for 1 minute, and then UV energy of 200 mJ/cm$^2$ was irradiated thereto for 5 seconds to cure the composition.

Finally, an anti-reflective coating film comprising a hard coat layer formed by infiltration into a substrate and a low refractive index layer covering the hard coat layer was manufactured.

Figure 5:
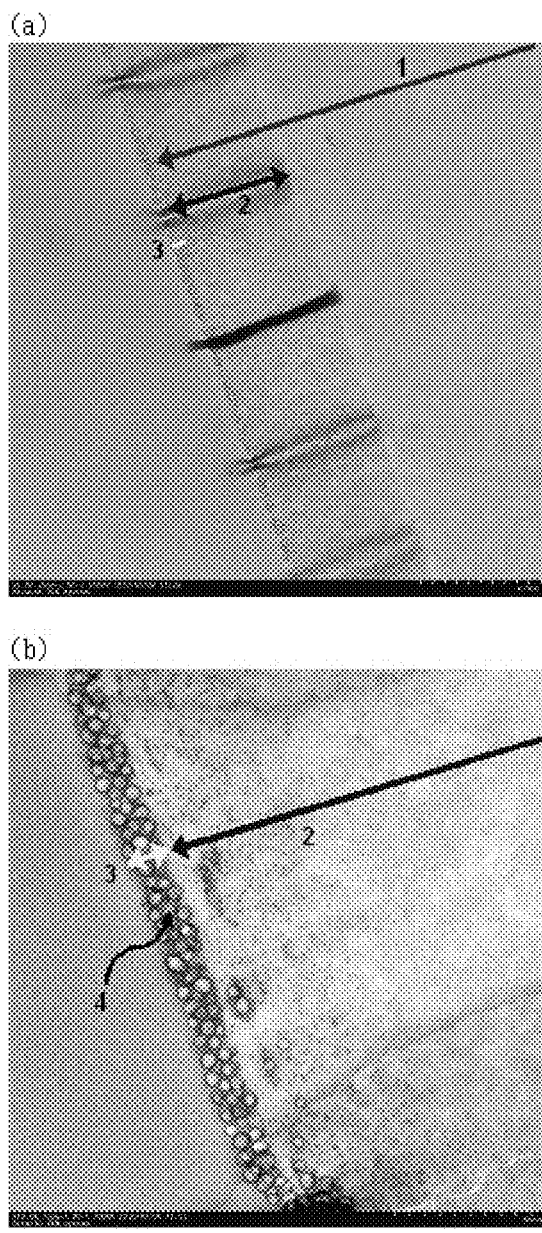

A cross-sectional image of the anti-reflective coating film is shown in FIG. 5(a), and a microscopic image of a part thereof is shown in FIG. 5(b). As shown in FIG. 5, the anti-reflective coating film according to Example 4 was found to have a hard coat layer 2 (approximately 2.78 μm) comprising a binder cured by infiltration into a substrate 1 and inorganic nanoparticles dispersed in the binder; and a low refractive index layer 3 (approximately 0.18 μm) comprising a binder cured on the hard coat layer 2 and hollow particle layers 4 dispersed in the binder.

In addition, there was no separate layer between the hard coat layer 2 and the low refractive index layer 3, and a ratio of the cross-sectional area of the hollow particles to any cross-sectional area of the low refractive index layer 3 was approximately 90%, indicating that hollow particles were very compactly distributed in the low refractive index layer 3. In the low refractive index layer 3, 3 to 5 hollow particle layers 4 were formed to be adjacent to each other, and the number of the hollow particles apart from the hollow particle layers was only approximately 3% of the total number of the hollow particles.

Comparative Example 1

Preparation of Anti-Reflective Coating Composition

Based on 100 parts by weight of pentaerythritol hexaacrylate (PETA);

15.87 parts by weight of silica nanoparticle-dispersed silica sol (dispersion medium: methyl isobutyl ketone and methyl alcohol, solid content: 40% by weight, number average diameter: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 125.91 parts by weight of methyl isobutyl ketone, approximately 41.98 parts by weight of ethanol, approximately 41.98 parts by weight of n-butyl alcohol and approximately 41.98 parts by weight of acetyl acetone) were mixed to prepare an anti-reflective coating composition.

(Manufacturing of Anti-Reflective Coating Film)

An anti-reflective coating film was manufactured under the same conditions and in the same manner as in Example 1, except using the above anti-reflective coating composition. A cross-sectional image of the anti-reflective coating film is shown in FIG. 6(a), and a microscopic image of a part thereof is shown in FIG. 6(b).

Figure 6:
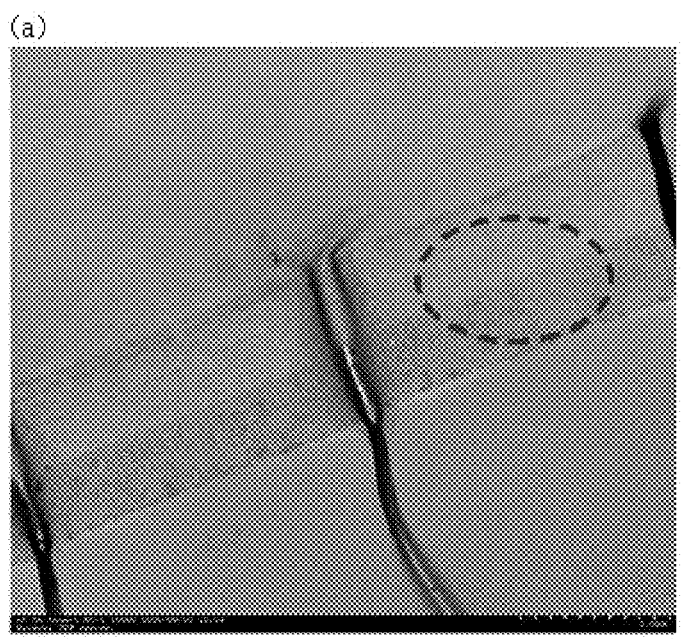
Figure 6:
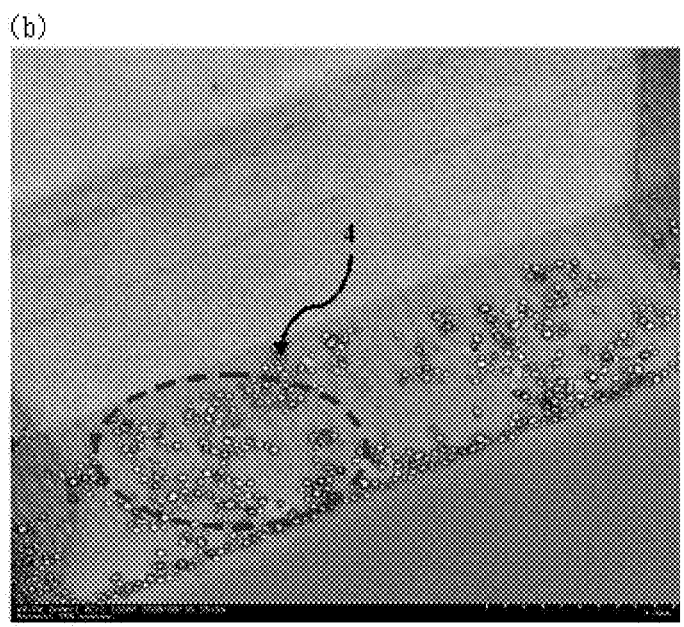

As shown in FIG. 6, in the anti-reflective coating film according to Comparative Example 1, phase separation of the composition did not occur properly (see the circle of FIG. 6(a)), and in particular, hollow particles 4 were very sparsely distributed in the low refractive index layer (see the circle of FIG. 6(b)). Thus, appearance of the film became opaque, and scratch resistance and anti-reflective effect were also reduced (see Experimental Example). In the anti-reflective coating film of Comparative Example 1, a ratio of the cross-sectional area of the hollow particles to any cross-sectional area in the entire area of the hollow particle-distributed region was found to be approximately 30~60%. In particular, hollow particles 4 were sparsely distributed in the anti-reflective coating film of Comparative Example 1, and thus hollow particle layers were not properly formed. Since some of the hollow particle lines were not compactly formed, they were not adjacent to each other and scattered.

Experimental Example

The anti-reflective coating films manufactured by Examples and Comparative Example were evaluated for the following items, and the results are shown in the following Table 1.

1) Measurement of reflectance: the back side of the anti-reflective coating film was treated with black color, and then low reflection property was evaluated by minimum reflectance value. At this time, a Shimadzu Solid Spec. 3700 spectrophotometer was used for measurement.

2) Measurement of transmittance and haze: HR-100 (Murakami Co., Japan) was used to evaluate transmittance and haze.

3) Evaluation of scratch resistance: the anti-reflective coating film was rubbed using a steel wool with a load of 500 g/cm² at a speed of 24 m/min 10 times, and then the number of scratches having a length of 1 cm or longer was counted on the surface. At this time, when no scratch was found on the film surface, it was evaluated as "very excellent" (◉), and when the numbers of scratch having a length of 1 cm or longer were 1 or more to less than 5, 5 or more to less than 15, and 15 or more, each was evaluated as "excellent" (○), "moderate" (Δ), and "poor" (X), respectively.

4) Microscopic imaging of cross-section of film: the cross-section of each film prepared by microtoming was observed using a Transmission Electron Microscope (name: H-7650, manufactured by HITACHI).

5) Evaluation of adhesion: adhesion of each film was evaluated by a cross cut test (ASTM D-3359) using a Nichiban tape.

TABLE 1

| | Reflectance (%) | Transmittance (%) | Haze (%) | Scratch resistance | Adhesion |
|---|---|---|---|---|---|
| Example 1 | 1.2 | 95.8 | 0.3 | ○ | 5B |
| Example 2 | 1.2 | 95.8 | 0.2 | ◉ | 5B |
| Example 3 | 1.67 | 95.2 | 0.3 | ◉ | 5B |
| Example 4 | 1.30 | 95.5 | 0.3 | ◉ | 5B |
| Comparative Example 1 | 2.0 | 94.0 | 0.7 | Δ | 2B |

As shown in Table 1, the anti-reflective coating films according to Examples had lower reflectance and higher transmittance than the film of Comparative Example, and they exhibited excellent scratch resistance and adhesion.

The invention claimed is:

1. An anti-reflective coating film, comprising: a first layer that comprises a first (meth)acrylate based binder and inorganic nanoparticles in the first (meth)acrylate based binder and that has infiltrated into a substrate; and a second layer that comprises a second (meth)acrylate based binder and 2 to 5 hollow particle layers in the second (meth)acrylate based binder and that covers and contacts the first layer; wherein each of the 2 to 5 hollow particle layers comprises sequentially connected hollow particles and the layers are adjacent to each other, wherein a ratio of the cross-sectional area of the hollow particles to any cross-sectional area of the second layer is 85 to 92%, and wherein adhesion of the anti-reflective coating film evaluated by a ASTM D-3359 cross cut test using a Nichiban tape is greater than 2B and equal to or less than 5B.

2. The anti-reflective coating film according to claim 1, further comprising one or more hollow particles apart from the 2 to 5 hollow particle layers.

3. The anti-reflective coating film according to claim 2, wherein one or more hollow particles are apart from the 2 to 5 hollow particle layers with a distance of 150 nm or less.

4. The anti-reflective coating film according to claim 2, wherein the number of the hollow particles apart from the 2 to 5 hollow particle layers is 10% or less of the total number of the hollow particles comprised in the film.

5. The anti-reflective coating film according to claim 1, wherein the first (meth)acrylate-based binder comprises a crosslinked polymer of a (meth)acrylate-based compound having a molecular weight of less than 600.

6. The anti-reflective coating film according to claim 5, wherein the first layer further comprises the region having the crosslinked copolymer of the (meth)acrylate-based compound having a molecular weight of less than 600 and the (meth)acrylate-based compound having a molecular weight of 600 to 100,000, in addition to the region having the crosslinked polymer.

7. The anti-reflective coating film according to claim 6, wherein the region having the crosslinked copolymer is located to a depth of approximately 5 to 50% of the first layer, based on the interface between the first and second layers.

8. The anti-reflective coating film according to claim 1, wherein the second (meth)acrylate-based binder comprises a crosslinked copolymer of a (meth)acrylate-based compound having a molecular weight of less than 600 and a (meth) acrylate-based compound having a molecular weight of 600 to 100,000.

9. The anti-reflective coating film according to claim 8, wherein the crosslinked copolymer is comprised to exhibit an increasing distribution gradient toward the second layer.

10. The anti-reflective coating film according to claim 1, wherein the second layer further comprises inorganic nanoparticles.

11. The anti-reflective coating film according to claim 1, wherein the second (meth)acrylate-based binder comprises a crosslinked copolymer of a (meth)acrylate-based compound having a molecular weight of less than 600, a (meth) acrylate-based compound having a molecular weight of 600 to 100,000 and a fluorine-based (meth)acrylate compound.

12. The anti-reflective coating film according to claim 1, wherein the inorganic nanoparticles have a number average diameter of 5 to 50 nm.

13. The anti-reflective coating film according to claim 1, wherein the inorganic nanoparticles are silica nanoparticles.

14. The anti-reflective coating film according to claim 1, wherein the hollow particles have a number average diameter of 5 to 80 nm.

15. The anti-reflective coating film according to claim 1, wherein the hollow particles are hollow silica particles.

* * * * *